INVENTOR.
William C. Wehner
BY
*Maxwell K. Murphy*
ATTORNEY.

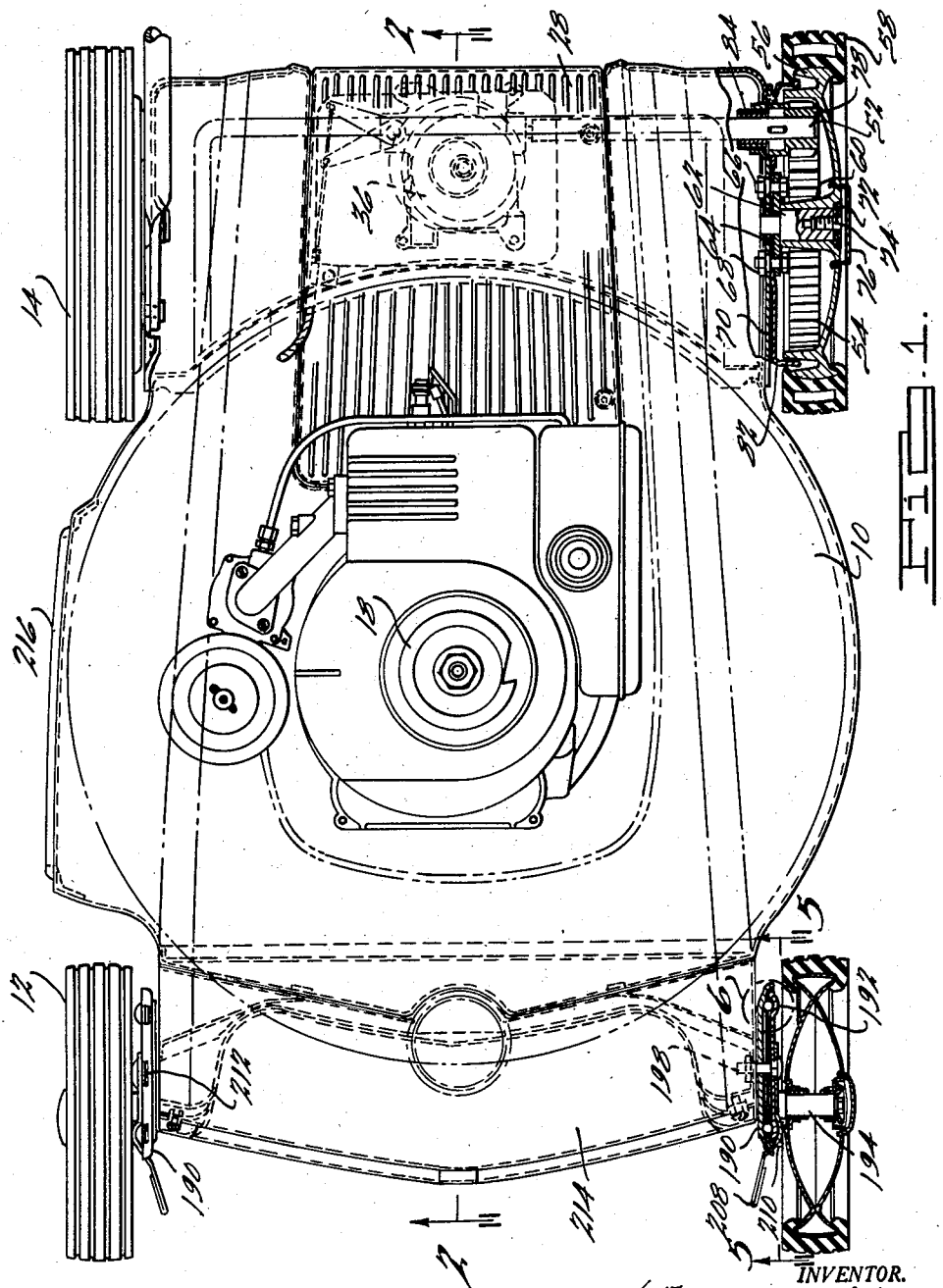

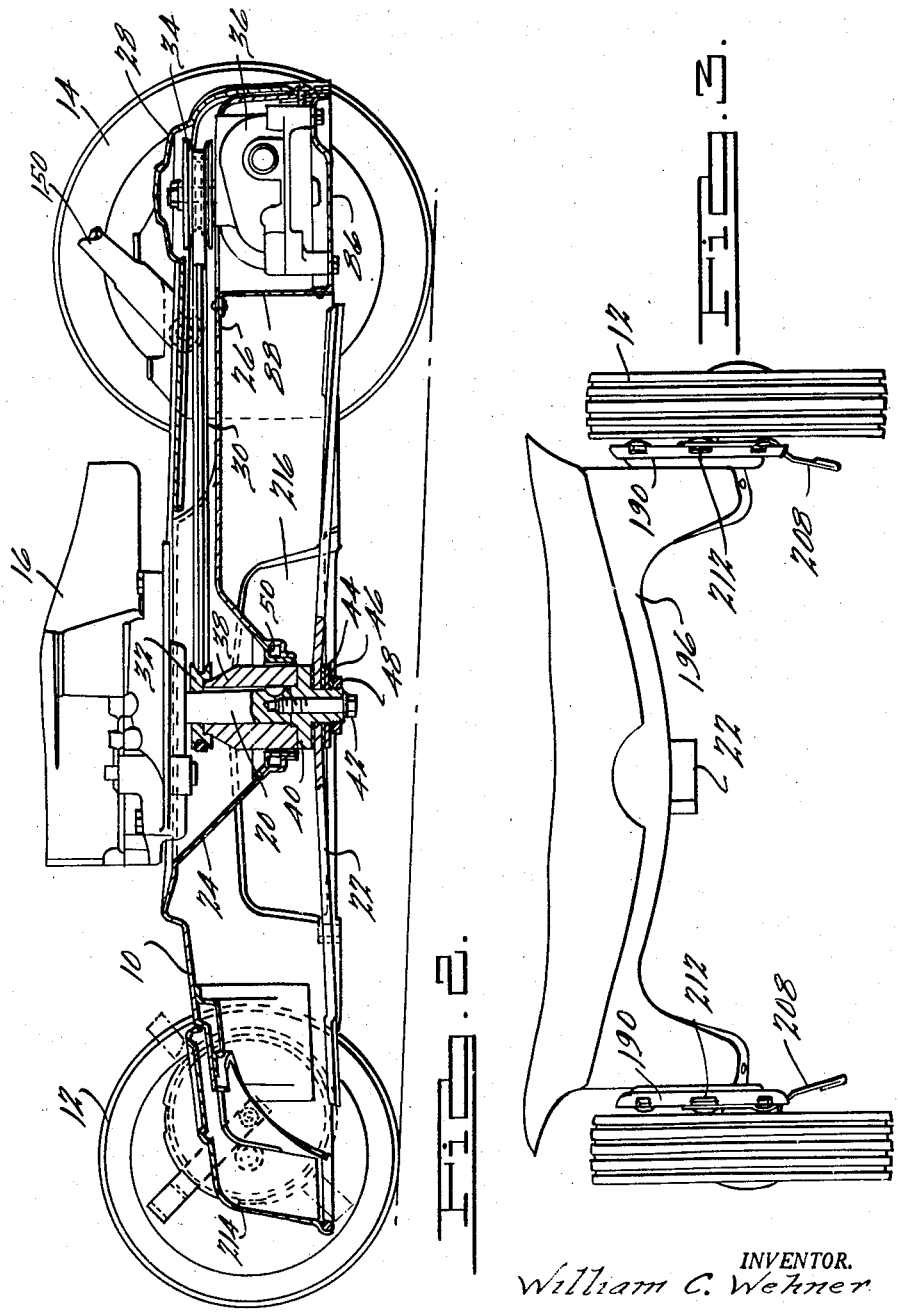

United States Patent Office 2,862,721
Patented Dec. 2, 1958

2,862,721

WHEEL ADJUSTMENT MEANS FOR LAWN MOWERS

William Charles Wehner, Grosse Pointe, Mich., assignor, by mesne assignments, to Moto-Mower, Inc., a corporation of Delaware Original application April 4, 1955, Serial No. 498,997. Divided and this application April 12, 1957, Serial No. 652,532

2 Claims. (Cl. 280—44)

This invention relates to lawn mowers of the rotary blade type and particularly to self-propelled mowers of this type, and this application is a division of my co-pending application Serial No. 498,997, filed April 4, 1955.

It is the principal object of this invention to provide, in a rotary mower, an easily operated device for adjusting the cutting height of the blade without use of tools and which does not require loosening of bolts, operation of clamps, or the like.

Other objects and advantages of the invention will be apparent from the following specification which, taken in conjunction with the accompanying drawings, describes a preferred embodiment thereof.

In the drawings,

Fig. 1 is a top plan view of the improved rotary mower with parts broken away to show sectional details;

Fig. 2 is a longitudinal sectional view taken along line 2—2 of Fig. 1;

Fig. 3 is a partial elevation of the mower from the front with the guard removed;

Figure 4:
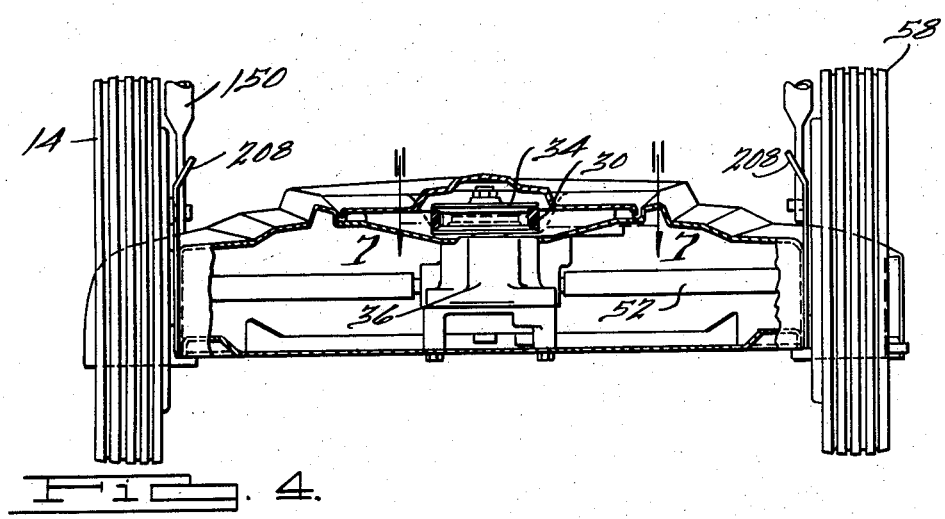
Fig. 4 is a partial transverse section taken just forward of the rear body frame member and showing the driving mechanism for the rear wheels.

Referring now to the drawings, it may be seen that the machine comprises a "deck" or chassis member 10 on which front wheels 12 and rear wheels 14 are mounted. The deck is of welded reinforced construction and carries the engine 16 on the top surface thereof. The engine is preferably of the 4-cycle, internal combustion type although any other suitable engine, electric motor, or the like may be used.

The engine 16 is mounted with its crankshaft vertically disposed. The crankshaft extends above the engine head (Fig. 1) and has a starting pulley 18 on the upper end. If desired, a recoil starter, electric starter, or similar device may be coupled to the shaft at this location. The shaft 16 extends below the bottom of the engine housing, the lower end 20 (Fig. 2) having the cutting blade 22 mounted directly thereon.

As will be seen in Fig. 2, the deck 10 is formed by stamping and has a conically dished portion 24 centrally thereof. Around the upper portion of the cone, a number of engine mounting bosses (not shown) are formed and the engine is rigidly mounted on these bosses. The rear portion of the cone has a depressed portion 26 which, together with a removable cover 28, form an enclosure for the driving belt 30. The belt 30 is trained around the pulleys 32 and 34. The pulley 34 is carried by the input shaft of the multi-speed transmission 36 which will be described later on.

The pulley 32 is mounted on a hub member 38 which is keyed to the shaft 20. A second hub member 40 carries the cutting blade assembly and has stepped surfaces which interfit with the member 38 and shaft 20 as shown, a cap screw 42 being provided for fastening the parts rigidly together.

The cutting blade 22 is sandwiched between two brass friction washers 44 over a round portion of the hub member 40 followed by a heavy steel D-hole washer 46 which fits over two milled flats. A hex nut 48 is threaded over the lower end of the member 40 and may be tightened to specific desired torque. This assembly of the cutting blade permits slippage of the blade on the hub in the event the blade hits an obstruction during use.

A reinforcing steel ring 50 is welded in the open lower end of the cone 24 and as will be seen from Fig. 2, the ring 50 surrounds a substantial portion of the hub member 38 with slight radial clearance. This construction is extremely effective in eliminating bending of the engine crankshaft since the shaft end portion 20 can deflect (when the blade 22 encounters an obstacle) only to the extent of the clearance between it and the inner surface of the hub member 38. Bending of the crankshaft sufficiently to impart a permanent "set" with subsequent failure thereof is thus entirely avoided.

Figure 5:
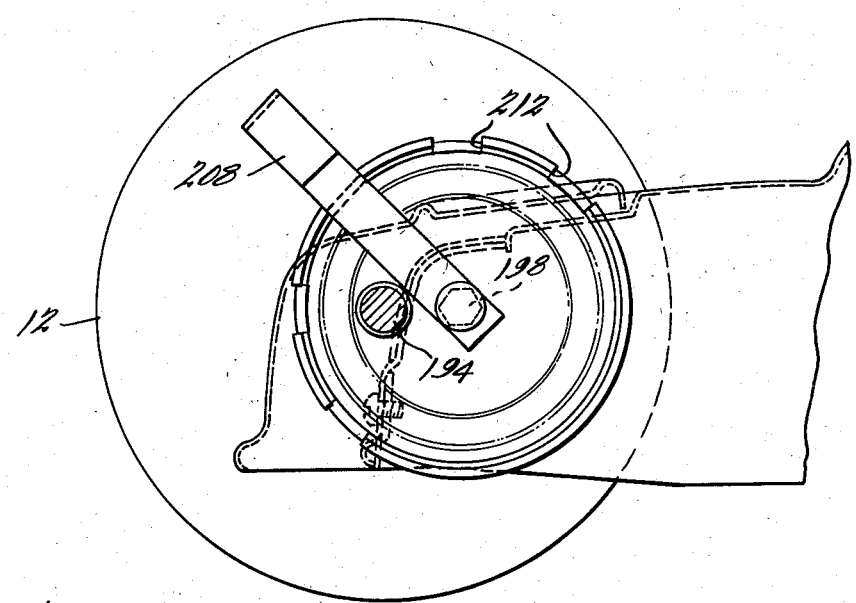
Fig. 5 is a detail showing of the front wheel adjustment means as seen when looking in the direction of the arrows 5—5 of Fig. 1.
Figure 6:
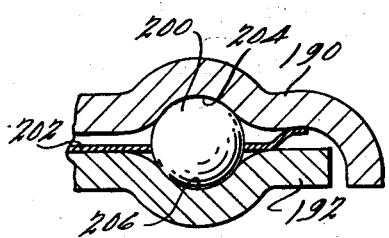
Fig. 6 is another detail of the wheel adjustment means shown in enlarged detail, the portion shown being indicated by the circle 6 in Fig. 1.

Referring now particularly to Figs. 1 to 6 inclusive, it may be seen that the rear propelling wheels 14 are driven from the transmission gearbox 36 by means of axle shafts 52. Each of the driving wheels comprises a casting having an integrally formed internal gear 54 and an integrally formed rim 56 on which is mounted a rubber tire 58.

The hub 60 of each wheel is rotatably carried on a stub axle 62 which is, in turn, carried by a plate assembly 64. The latter is secured to the deck structure by the bolts 66 which threadedly engage the weld nuts 68 fixed to the mounting plates 70. The wheel hub 60 has a counterbore which holds a felt seal 72 that is slightly compressed when the wheel mounting screw 74 is tightened. A hub cap 76 snaps into place over the end of the screw 74 to protect the hub and present a neat appearance.

The internal gear 54 is engaged by a pinion 78 carried on the outer end of the axle shaft 52 and driven from the shaft through a conventional differential pawl which provides a one-way only drive to the wheel. A spider 82 secured to the plate 70 seals the assembly against entry of dirt or water which might adversely affect quiet operation of the gear and pinion drive. The shaft 52 is self-aligning and is supported near its outer end by a bushing 84 carried by the plate 70.

The gearbox 36 is carried on a plate 86 which is suspended from the deck of the machine by a vertically disposed plate 88. The front deck cover extends downwardly and the plate 86 is suitably fastened thereto, thereby providing a rigid support for the gearbox.

The mower is guided by a handle assembly which is free-floating for eliminating shock transmission to the hands of the operator when mowing over rough terrain. The handle assembly is divided into two sub-assemblies for convenience in shipping. The lower sub-assembly 150 consists of a ¾ inch tube formed into an arch with each leg thereof pivotally attached to the rear portion of the deck 10 (see Fig. 2). The upper sub-assembly (not shown) comprises a pair of ¾ inch tubes bent outwardly at their upper ends on which handle grips are placed.

Attention is now directed to Figs. 1–6 inclusive, for a description of the means for adjusting the depth of cut of the mower.

The front wheel mounting comprises a pair of stamped ball races 190, 192, concentrically mounted. The outer race 192 has a stub axle 194 welded thereon one inch from the center of the race. The inner race 190 is welded to the vertical side portion of the front section 196 of the deck 10. The races are secured in assembled relation by a carriage bolt 198, a plurality of balls 200 being disposed between the races in grooves 204, 206, formed therein by stamping. A combined retainer and seal 202 of brass or similar material retains the balls in properly spaced relation and prevents entry of foreign matter.

A lever 208 of spring steel is mounted on the bolt 198, along with the outer race 192, and engages a slot 210 in the outer race 192. The inner race 190 is provided with a series of slots 212, preferably five or more, in one of which the lever 208 is engaged. It will now be clear that because of the eccentric mounting of the axle 194 on the outer race 192, rotation of that race around the axis of the bolt 198 will effect an adjustment of the front wheel 12 with respect to the body of the mower. This adjustment is easily accomplished without use of tools by engaging the spring lever 208 with the finger and bending it outwardly until it is disengaged from the slot 212 whereupon the outer race assembly may be rotated with respect to the inner race on the balls 200. The lever 208 may be reengaged in any desired one of the slots 212 to provide the height adjustment required. Each of the front wheels is thus individually adjustable.

The front wheels 12 are constructed of two identical stampings, welded together along a circumferential line medially intermediate the hub and rim portions as illustrated in Fig. 1, the outer marginal portions being flared and bent over to form a rim adapted to mount a rubber tire.

As may be seen from Figs. 1, 2, 5 and 11, the deck stamping 10 has skirts at the sides thereof which extend below the plane of the cutting blade 22 for safety. The right hand skirt is provided with a discharge chute 216 which permits discharge of grass cuttings (and leaf mulch when a mulching attachment is used) to one side of the machine. The deck stamping is open at the front such that the blade 22 extends forwardly of the deck between the front wheels 12. This permits cutting of tall grass, weeds, etc., which could not be cut if the blade did not extend beyond the front end of the deck. A removable cover 214 is suitably fastened to the deck during all ordinary operation of the mower, the cover extending downwardly sufficiently to cover the blade and prevent accidents.

I claim:

1. In a lawn mower or the like, the combination of a deck having a horizontal portion and depending skirt portions, means mounting a ground eangging wheel on said deck comprising a fixed plate secured to one of said skirt portions and having an outwardly facing annular ball race formed therein, a marginal flange carried by said fixed plate having radial slots therein, a second plate rotatably secured to said fixed plate and having an inwardly facing annular ball race formed therein, a plurality of balls disposed in said races, a spring lever carried by said second plate and adapted to be engaged with one or another of said radial slots for rotatively positioning said second plate in selected position, and a wheel-axle eccentrically mounted on said second plate.

2. In a lawn mower or the like, the combination of a deck having a horizontal portion and depending skirt portions, means mounting a ground engaging wheel on said deck comprising a fixed plate secured to one of said skirt portions and having an outwardly facing annular ball race formed therein, a marginal flange carried by said fixed plate having radial slots therein, a second plate rotatably secured to said fixed plate and having an inwardly facing annular ball race formed therein, a plurality of balls disposed in said races, a spring lever carried by said second plate and adapted to be engaged with one or another of said radial slots for rotatively positioning said second plate in selected position, a wheel-axle eccentrically mounted on said second plate, an annular member disposed between said plates having holes for loosely holding said balls in spaced relation, said member having an annular marginal portion engaging said second plate radially outwardly of said balls and an annular flanged portion engaging said fixed plate radially outwardly of said balls whereby said assembly is sealed against entry of foreign matter.

References Cited in the file of this patent
UNITED STATES PATENTS

| | | |
|---|---|---|
| 473,816 | Binns | Apr. 26, 1892 |
| 706,209 | Sumner | Aug. 5, 1902 |
| 1,304,783 | Lederer | May 27, 1919 |
| 1,880,915 | Dyer | Oct. 4, 1932 |